United States Patent
Goldberg et al.

(10) Patent No.: US 7,420,149 B2
(45) Date of Patent: Sep. 2, 2008

(54) NETWORK SENSOR SYSTEM AND PROTOCOL

(75) Inventors: Bar-Giora Goldberg, San Diego, CA (US); Gioia Messinger, Encinitas, CA (US)

(73) Assignee: Avaak, Inc., San Diego, CA (US)

( * ) Notice: Subject to any disclaimer, the term of this patent is extended or adjusted under 35 U.S.C. 154(b) by 95 days.

(21) Appl. No.: 11/210,411

(22) Filed: Aug. 24, 2005

(65) Prior Publication Data

US 2007/0051872 A1    Mar. 8, 2007

(51) Int. Cl.
*H01L 27/00* (2006.01)
*G08C 17/00* (2006.01)

(52) U.S. Cl. .................. 250/208.1; 348/211.2; 370/311
(58) Field of Classification Search ............. 250/208.1; 348/207.1, 211.2; 370/311
See application file for complete search history.

(56) References Cited

U.S. PATENT DOCUMENTS

| | | | |
|---|---|---|---|
| 2006/0012685 A1* | 1/2006 | Gannon | 348/211.2 |
| 2006/0087560 A1* | 4/2006 | Moran et al. | 348/207.1 |
| 2006/0114872 A1* | 6/2006 | Fujii et al. | 370/338 |
| 2007/0039030 A1* | 2/2007 | Romanowich et al. | 725/105 |
| 2007/0051872 A1* | 3/2007 | Goldberg et al. | 250/208.1 |
| 2007/0057814 A1* | 3/2007 | Goldberg et al. | 340/870.02 |
| 2007/0101382 A1* | 5/2007 | Aramaki et al. | 725/105 |

* cited by examiner

Primary Examiner—John R Lee

(57) ABSTRACT

A network sensor system and protocol is provided. The network sensor system includes a sensor node that has a sensor for collecting high-resolution data, and a radio for transmitting that data to a central hub. The sensor node communicates to the hub with a wireless data link, and operators solely from a battery. Accordingly, the sensor node is autonomous, and has no wire connections, so may be discreetly and simply installed. The sensor node is normally operated in a power-saving sleep mode, and is minimally activated only for required periods of time. The sensor node may be activated responsive to a low power timer, or from another locally generated interrupt. The sensor node also implements power-saving transfer protocols to further reduce power needs. Many sensor nodes may be associated with a single central hub, and larger networked sensor systems may be arranged.

29 Claims, 9 Drawing Sheets

NETWORK SENSOR SYSTEM AND PROTOCOL

FIELD OF THE INVENTION

The present invention relates to a network of imagers and their associated hubs. More particularly, the present invention relates to a set of network cameras communicating with a central hub using power saving protocols and structures.

BACKGROUND

The field of remote sensing is growing rapidly. Remote sensing has been found to be useful in security applications, as well as for monitoring environmental, commercial and industrial processes. Remote sensing may include capturing visible light images, temperature, vibrations, seismic, infrared images, chemical or acoustic data. The remote data is either stored locally for later collection, or is transmitted via a wired or wireless connection to a data collection point. One popular remote sensor is the Internet camera. It will be understood that many other different types of sensors and sensor devices are available.

An Internet camera typically has a visible light sensor, and a connection to a local server or other host. The data connection may be wired or wireless. The Internet camera, similar to many types of sensor systems, uses a substantial amount of power. For example, the sensor itself may be a drain, as well as a local processor and memory system. Also, if the Internet camera uses a wireless communication connection, then radio transmitter and receiver each are significant power users. Because an Internet camera uses a substantial amount of power, the Internet camera needs an enduring power source. For example, the Internet camera may use a power adapter connected to grid power, or, if it uses a wired data link, may extract power from the data connection. In another example, the Internet camera may be constructed to allow for recharging of batteries, or for regular battery replacement. In a specific example, some digital cameras are known to have a Bluetooth compatible local connection. These digital cameras may be used to take an image, and then, the user is allowed to establish a wireless communication for moving the pictures to the computer. However, the digital camera has batteries that must be regularly replaced, or recharged. In this way, the digital camera is undesirable for any meaningful long-term monitoring or security applications.

Because the Internet camera needs enduring power, its placement options are limited. Take for example a security installation. It would be desirable to place Internet cameras in discreet, out-of-the-way locations, and to have multiple cameras imaging a target area. However, these discreet locations are often difficult to physically get to, and do not have ready power sources. Accordingly, either 1) the discreet locations must be wired for power, or 2) the cameras must regularly accessed for battery replacement. Either option is costly, and disruptive of the target area.

It is also desirable that sensors be able to take detailed and high resolution data, and communicate that data to a central location. In this regard, some sensors, such as the Internet camera, generate very large data or image files. Transmitting these large files may take substantial power, particularly in a wireless installation. It may be possible to save power by reducing the size of the image file, but important resolution and image detail may also be lost.

According, there is a need for a wireless imager system that can be installed without the need to run power or data cables, and that is still able to transfer high resolution data.

SUMMARY OF THE INVENTION

Briefly, the present invention provides a network sensor system and protocol. The network sensor system includes a sensor node that has a sensor for collecting high-resolution data, and a radio for transmitting that data to a central hub. The sensor node communicates to the hub with a wireless data link, and operators solely from a battery. Accordingly, the sensor node has no wire connections, so may be discreetly and simply installed. The sensor node is normally operated in a power-saving sleep mode, and is minimally activated only for required periods of time. The sensor node may be activated responsive to a low power timer, or from another locally generated interrupt. The sensor node also implements power-saving transfer protocols to further reduce power needs. Many sensor nodes may be associated with a single central hub, and larger networked sensor systems may be arranged.

In a more specific example, the network sensor system includes a camera node that has an image sensor for collecting one or more high-resolution images, and a radio for transmitting that image data to a central hub. The camera node communicates to the hub with a wireless data link, and operators solely from a battery. Accordingly, the camera node has no wire connections, so may be discreetly and simply installed. The camera node is normally operated in a power-saving sleep mode, and is minimally activated only for required periods of time. The camera node may be activated responsive to a low power timer, or from another locally generated interrupt. The camera node also implements power-saving transfer protocols to further reduce power needs. Many camera nodes may be associated with a single central hub, and larger networked image systems may be arranged.

Advantageously, the network sensor system operates node sensors that need no wired connections. In this way, the node sensors can be discreetly and simply installed. The node sensors are highly power efficient, allowing for undisturbed operation for up to three years or more in some configurations.

DETAILED DESCRIPTION OF THE PREFERRED EMBODIMENT

Figure 1:
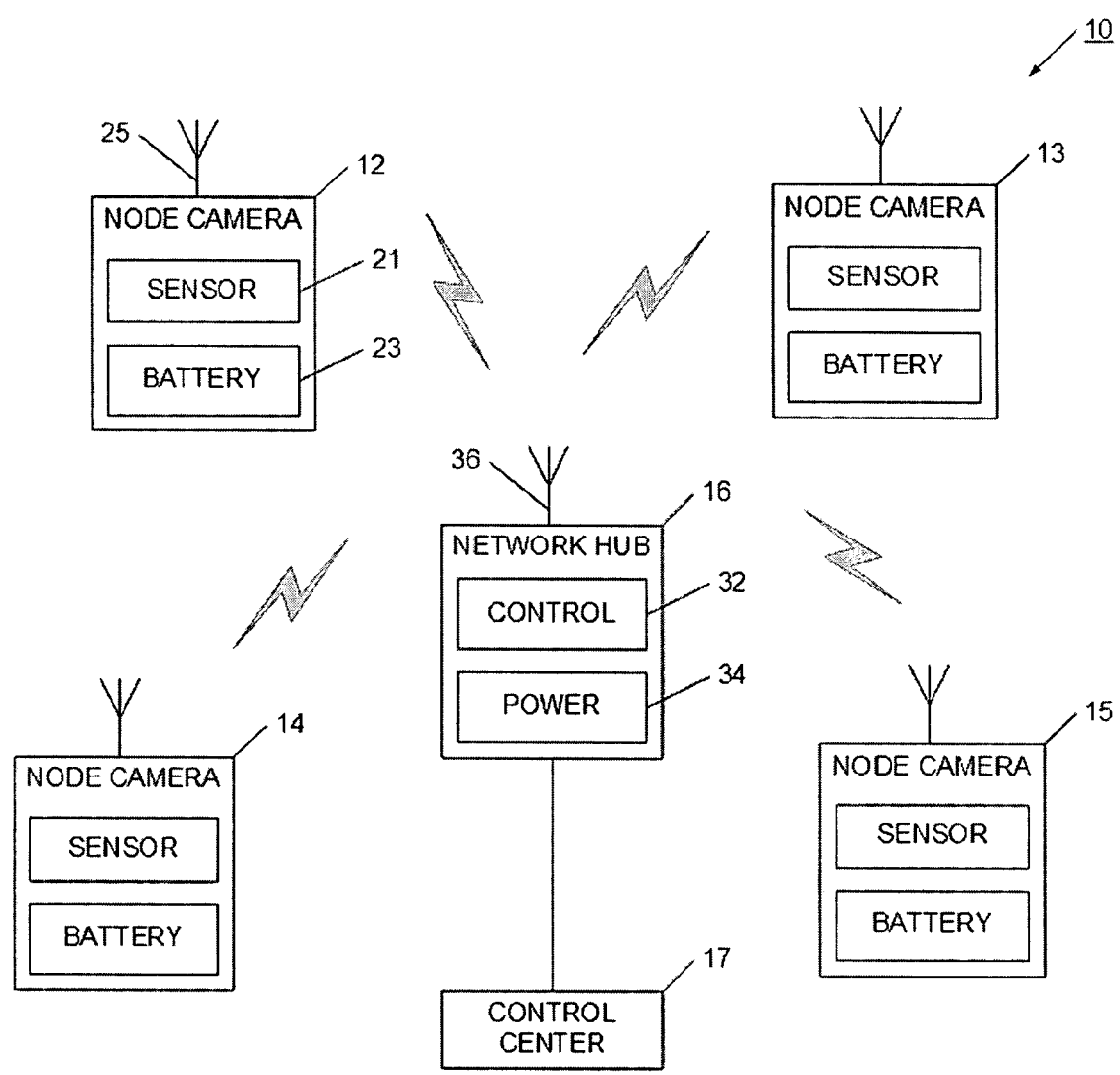
FIG. 1 is a block diagram of a network sensor system in accordance with the present invention.

Referring now to FIG. 1, a network sensor system is illustrated. Network sensor system 10 has a set of node cameras constructed to communicate with network hub 16. More specifically, FIG. 1 shows camera 12, camera 13, camera 14, and camera 15 wirelessly communicating with network hub 16. It will be appreciated that more or fewer cameras may be used, and that node cameras may be provided with different functionality. For example, some node cameras may be constructed to image invisible light, while others may be configured to monitor other wavelengths or to have sensors for detecting other activities. Although network sensor system 10 is described using visible light and image sensors, it will be appreciated that other types of sensors may be used. For example, the sensors may provide acoustic, seismic, spectral, vibration, or other types of information. Each of the node cameras in network sensor system 10 is constructed to be a self-contained, self configuring, remote imaging device. In particular, each node camera, such as node camera 12, operates in a way that conserves battery 23 power while enabling high-quality sensor 21 images to be transmitted to network hub 16 from time to time. The structure and protocols used by node camera 12 enable the node camera to operate on the same battery 23 for one or more years. In this way, node cameras may be distributed in an area, provide image information over an extended period, and require no maintenance for extended periods.

Generally, node camera 12 has sensor 21 and battery 23 contained in a small compact physical housing. The housing also has a radio and antenna 25 to facilitate wireless communication with network hub 16. Node camera 12 also has a processor for managing the sensor and compressing image data prior to transmission. It will be appreciated that other components may be used in node camera 12. Network hub 16 also has a radio and antenna 36 for communicating with the node cameras. Typically, network hub 16 will be located in a more convenient accessible location, so its power requirements are less constrained than the power requirements for the node cameras. In one example, power 34 may be provided by a rechargeable battery. In another example, power 34 may be provided as a power adapter connected to an enduring power source. Since network hub 16 has increased power availability, it is provided with more advanced control 32 capability and processing power. It will be appreciated that network sensor system 10 may include more then one hub, with each hub communicating to its own set of node cameras.

Network hub 16 may itself be a node on a larger network system. For example, network hub 16 may communicate with control center 17. Control center 17 may communicate with other network hubs, or may provide an interface for controlling network sensor system 10, as well as viewing or analyzing images taken from individual node cameras. It will be appreciated that control center 17 may comprise displays, storage equipment, and computer processing equipment. In this regard, controls to control center 17 may incorporate automatic processes for evaluating and assessing images received from node cameras. For example, the control center 17 may have processes for analyzing node camera images for risk assessment, as well as automated communication equipment for initiating and sending communications.

Figure 2:
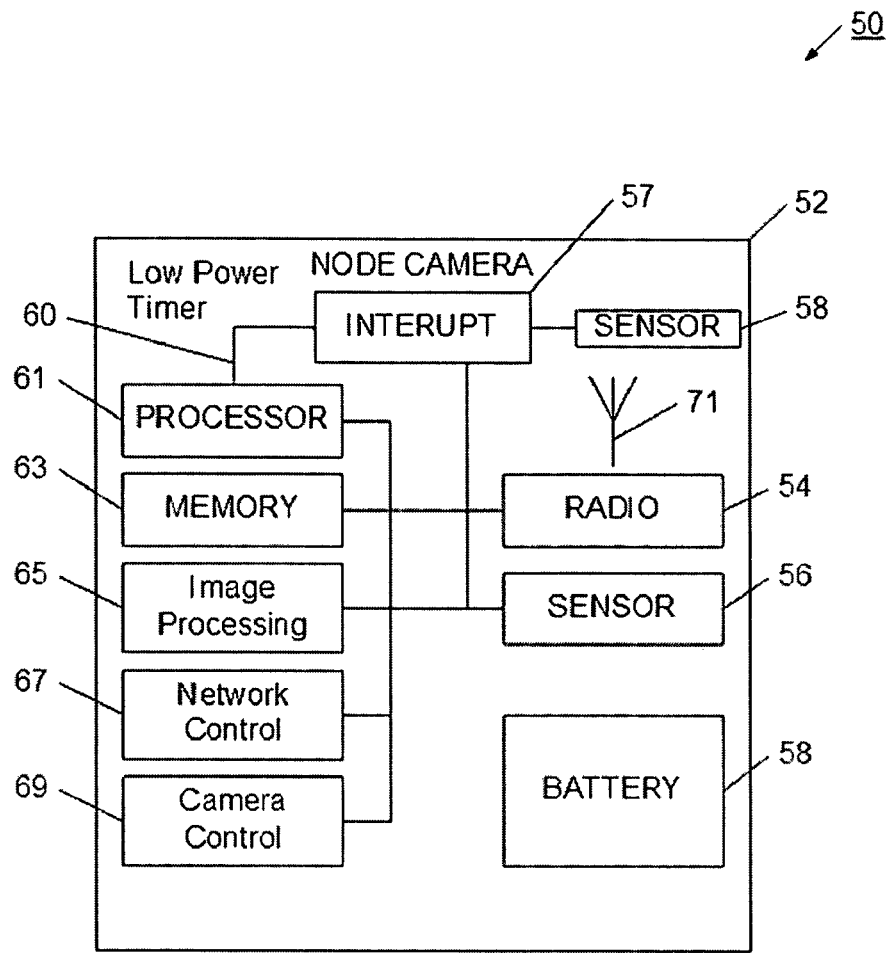
FIG. 2 is a block diagram of a node imager for use in a network sensor system in accordance with the present invention.

Referring now to FIG. 2, node camera 50 is described. Node camera 50 may be used, for example, in a network sensor system similar to network sensor system 10 described with reference to FIG. 1. Node camera 50 has a small and compact housing 52 for enclosing and protecting camera components. Node camera 50 includes a sensor 56 for capturing images in an area near node camera 50. The sensor may be, for example, a CMOS sensor for reduced power consumption, or may employ CCD imaging technology. The sensor may also be constructed to capture visible wavelength information, or may be set to detect other wavelengths, such as infrared. In another example, sensor 56 may be a seismic, vibration, audio, spectrometer, or other type of sensor. Node camera 50 also has processor 61 for providing control and processing capability to the node radio. For example, processor 61 may be constructed to configure and control sensor 56. In another example, processor 61 may apply image processing 65 to captured images, for example, to compress or encrypt image data. In one specific example, processor 61 applies a JPEG compression algorithm to images captured by sensor 26.

Processor 61 may also implement network control 67 settings and processes. For example, network control settings may define how often the node camera attempts to communicate with a hub, or settings regarding encryption or compression. Further, network control 67 settings may include a unique ID for node camera 50. The unique ID enables a control hub to be associated with a particular node camera. Node camera 50 also has camera control 69 settings. Camera control 69 settings may set integration times for sensor 56, define capture windows, or define timing and sequential information regarding image capture.

In providing the various functions, processor 61 cooperates with local memory 63. Local memory 63 provides storage space for images captured by sensor 56, as well as memory space for application and algorithmic processes performed by processor 61. Node camera 50 is intended for discrete installation, as well as long-term operation without any required maintenance. This includes for example remote operation relying fully on battery 58 for power. Depending upon network and camera settings, node camera 50 may operate without battery replacement for up to three years or more. It will be appreciated that as battery technology advances, additional gains in battery life may be expected. Even in a typical installation, node camera 50 has an expected battery life of over one year.

Battery 58 life is extended by having the node camera normally operate in a sleep mode, and only activating the node camera for necessary periods of time. More specifically, node camera 50 normally operates in a sleep mode where radio 54 is deactivated. Further, except as discussed below, processor 61 is also deactivated. In sleep mode, the processor 61 is deactivated except for a low power timer. This low power timer draws in the range of 5 to 10 micro amps of power. The low power timer may be set to generate an interrupt at a set time or on a periodic basis. When the low power timer generates interrupt signal 60, an interrupt 57 activates radio 54 as well as processor 61. The node camera, now being activated, acts according to its defined network controls 67 and its camera controls 69. In one specific example, when the node camera first wakes up, it generates a request signal through radio 54, which is transmitted by antenna 71.

After the request signal has been transmitted, the radio 54 enters a listen mode for a defined short period of time. For example, this listen mode may be opened for 20 ms to 50 ms. During this listen mode, the node camera 50 is waiting to receive an acknowledgment signal from a control hub. If no acknowledgment signal is received during the listen period, the node camera 50 goes back to sleep, which may be for a programmable time period. If however, the hub does respond, then the hub may command the node camera 50 to take additional action. These actions could include, to take an image, to transmit a stored image, or to go back to sleep. Of course, the node camera power requirements increase dramatically while radio 54 and processor 61 are operating. However, the radio and processor operate for only a short period of time, so the overall drain is not substantial. Accordingly, it will be recognized that overall battery life is highly dependent on how often the low power timer 60 causes the node camera to wake up. For example, if the node camera 50 is set to wake up and transmit its request signal once every 10 minutes, then the battery life may extend to about three years. More frequent wake ups will result in a shorter battery life.

Node camera 50 may also have another sensor 58 useful for generating interrupt 57. For example, sensor 58 could be a microphone which generates an interrupt signal upon receiving an audio signal above a defined threshold. This may be useful, for example, in security situations. Upon detecting a substantial noise, interrupt 57 is generated, which then activates radio 54 and processor 61. The camera control settings 69 may be set such that if sensor 58 activates the radio, then sensor 56 captures an immediate image. Sensor 58 may also be, for example, a temperature sensor, an image sensor, or a vibration sensor. It will be appreciated that other types of sensors may be used. In another example, sensor 58 and sensor 56 are windows on the same CMOS sensor.

Figure 3:
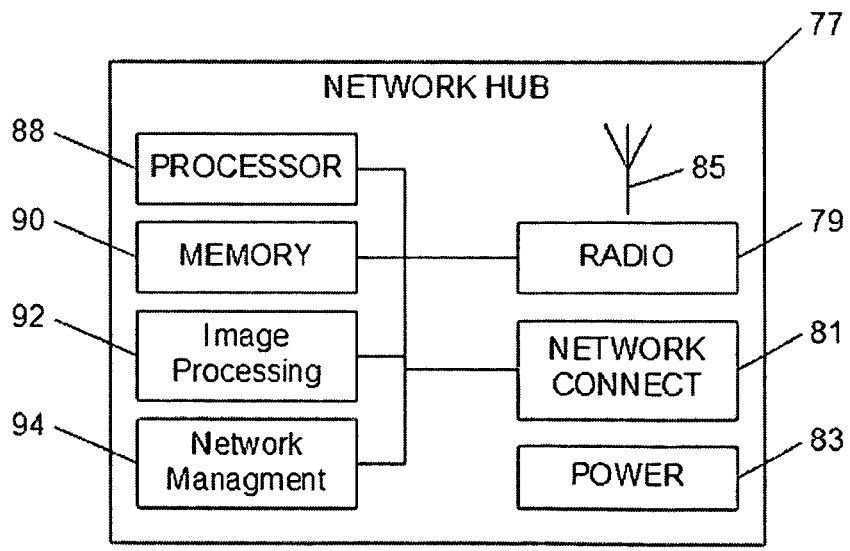
FIG. 3 is a block diagram of a network hub for use in a network sensor system in accordance with the present invention.

Referring now to FIG. 3, network hub 75 is illustrated. Network hub 75 is intended to facilitate communication and control of a set of node cameras, similar to node camera 50 described with reference to FIG. 2. Network hub 75 is intended to be installed in a reasonably accessible area so that power is less constrained then in the node camera. In this regard, housing 77 may be substantially larger than the housing used for the node camera. Also, power 83 may be provided by rechargeable batteries, or even through a direct connection to an enduring power source, such as a wall outlet. Network hub 75 may also include network connection 81, such as an Internet connection, for connection to a local or a proprietary wide area network. In this way, numerous network hubs may be connected together, as well as provide for convenient communication to a central control station. Network hub 75 also includes a radio 79 with antenna 85. The radio and antenna are constructed to facilitate two-way communication with a node camera. Network hub 75 also includes a processor 88 which cooperates with memory 90 for performing image processing functions 92 and network management functions 94. Since power is reasonably available on network hub 75, significant image processing, algorithmic processes, and network management functions may be performed. Also, it is not necessary that radio 79 be operated normally in sleep mode. It will be appreciated that, depending upon application specifics, the radio 79 and processor 88 may also be operated in a sleep mode for periods of time to conserve energy.

Figure 4:
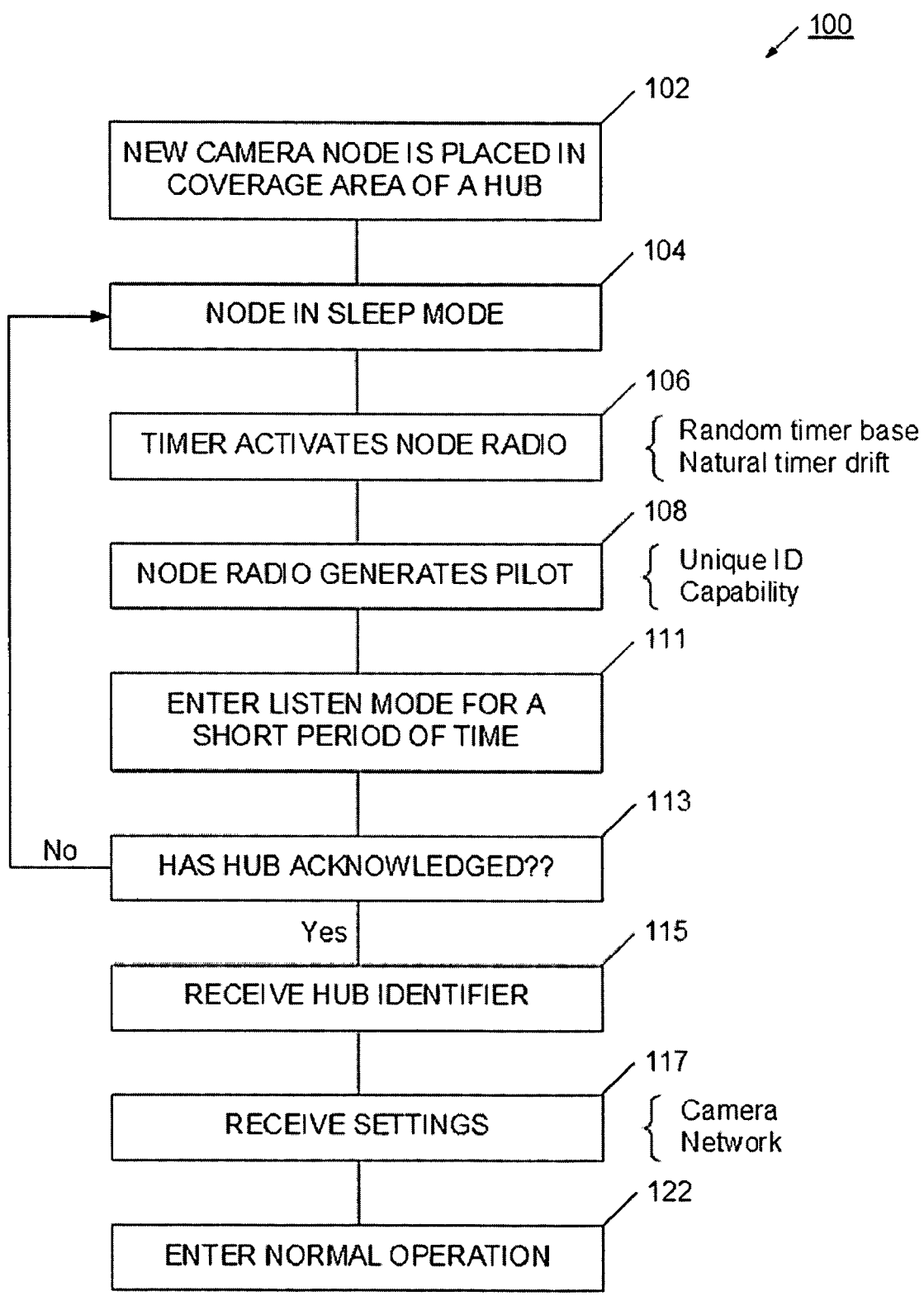
FIG. 4 is a flowchart for initializing a node imager for use in a network sensor system in accordance with the present invention.

Referring now to FIG. 4, a network protocol for operating a node camera is illustrated. Protocol 100 is used to operate a node camera similar to node camera 50 discussed with reference to FIG. 2. Protocol 100 also uses a control hub similar to control network hub 75 illustrated with reference to FIG. 3. Protocol 100 is useful for first configuring and initializing the operation of a node camera on a network hub. As shown in block 102, a new camera node is placed in a coverage area of a control hub. Typically, the coverage area of a control hub will extend to a range of 100 to 300 feet. This distance may vary according to environmental conditions. For example, an open space environment may extend out to 300 feet, while a more cluttered environment may be more restricted to about 100 feet. It will also be appreciated that transmission power in the camera node and sensitivity in the control hub will affect coverage area. For example, diverse antennas in the control hub may increase sensitivity to further extend coverage area.

When a camera is first placed in a coverage area, it is activated and enters sleep mode as shown in block 104. The camera node may be activated, for example, by inserting its battery. It will also be appreciated that the camera node may have a switch or other activation structure for being activated. However, it will be appreciated that if the camera is activated by inserting batteries, then fewer parts can be used, reliability may be increased, and the risk of accidental deactivation is eliminated. The camera may immediately enter its sleep mode, which means that it is operating with minimal power consumption. For example, the camera radio, sensor, and processor are all substantially deactivated. It will be appreciated that a small timer and interrupt circuit may be kept active to facilitate waking the camera back up. This timer can be, for example, a discrete circuit, or in some constructions, may be part of the processor. In this latter example, the processor may be substantially shut down except for a small timing and interrupting routine. In this operation, the processor draws in the range of about 5 micro amps to about 10 micro amps. At these very low power consumptions, battery life can be greatly extended.

At a predefined time or after a predefined time period, the low power timer generates an interrupt, which activates the node radio as shown in block 106. The node radio then generates a pilot request signal as shown in block 108. This pilot signal may include the unique identification number for the node camera, as well as its general capability. The unique ID enables a control hub to identify and associate with a particular set of cameras. The pilot signal may also include an indication that it is not associated with any particular hub. This can be done, for example, by sending a null value where a hub identification number would normally be transmitted. The pilot signal may also include a general capability for the camera hub. This could be, for example the type of sensor used, or the capabilities of the sensor. Once the radio has generated the pilot request signal, the radio enters a listen mode for a short period of time as shown in block 111. This short period of time may extend, for example, for about 20 ms to about 50 ms. It will be appreciated that the period of time may be adjusted according to specific application and performance requirements. During the listen mode, the camera node waits to receive an acknowledgment from a central hub. If the short period of time expires, and the hub has not acknowledged as shown in block 113, then the node camera returns to sleep mode as shown in block 104. The hub may not have acknowledged for a variety of reasons. For example, the hub may be out of range, therefore requiring the camera to be moved closer. In another example, the control hub may have been busy communicating with another node camera. It will be appreciated that the node camera and the central hub do not operate synchronously or on a common time base. Further, all camera nodes also do not operate on a common time base. Therefore, communication collisions are likely to occur when several camera nodes are attempting to asynchronously communicate with the same central node. If, for example, several cameras are operating with similar clocks, and are requesting communication at the same interval, then communication collisions are likely to occur. In a more specific example, if two cameras are each configured to attempt communication every 10 minutes, and they happen to request communication at about the same time, then one camera may never make contact with the control hub.

To avoid this continual communication collision, the node camera is provided with a particularly unstable and inaccurate timer. In this way, the low power timer generates an interrupt signal in a somewhat randomized pattern. Accordingly, even if interrupts are generated that cause a communication collision, over a relatively short period of time, the timer will have varied enough to avoid further collision. In another example, the node camera could be provided with a randomization circuit for also providing a more fully random timer generation pattern. However, the normal inaccuracies of the low-power processor timer have been found sufficient to avoid continual collisions. If the hub does acknowledge within the listen period as shown in block 113, then the hub responds with an acknowledgment message. The acknowledge message may include the hubs unique identifier as shown in block 115. In this way, the camera can associate with one and only one hub. It will be appreciated that other more complex arrangements may allow multiple hubs to communicate with the camera.

The communication hub may also determine particular settings for the camera node. In this regard, the camera hub may transmit settings to the camera node. Those settings are received at the camera node as shown in block 117. These settings may include, for example, camera settings. Camera settings could be for example, timing and sequence information for capturing images, resolutions to be used, windows to be used, compression processes to be used, integration times, or other sensor settings. It will be understood that the specific sensor settings are determined by the particular sensor used, and the specific applications being performed. The settings may also include network settings. These network settings may include, for example, how often the low-power timer interrupt is to be set, transmission characteristics, and how to perform upon activation. By operating method 100, a camera node has been associated with a single camera hub, and the camera hub has been associated with a defined set of camera nodes. In this way, even in a multi-hub environment, each camera and hub have a known communication path. Once the association has been properly made, and the camera node has been set, then the camera node enters its normal operation as shown in block 122. As will be described more fully later, normal operation entails entering and sustained operation in a sleep mode.

Figure 5:
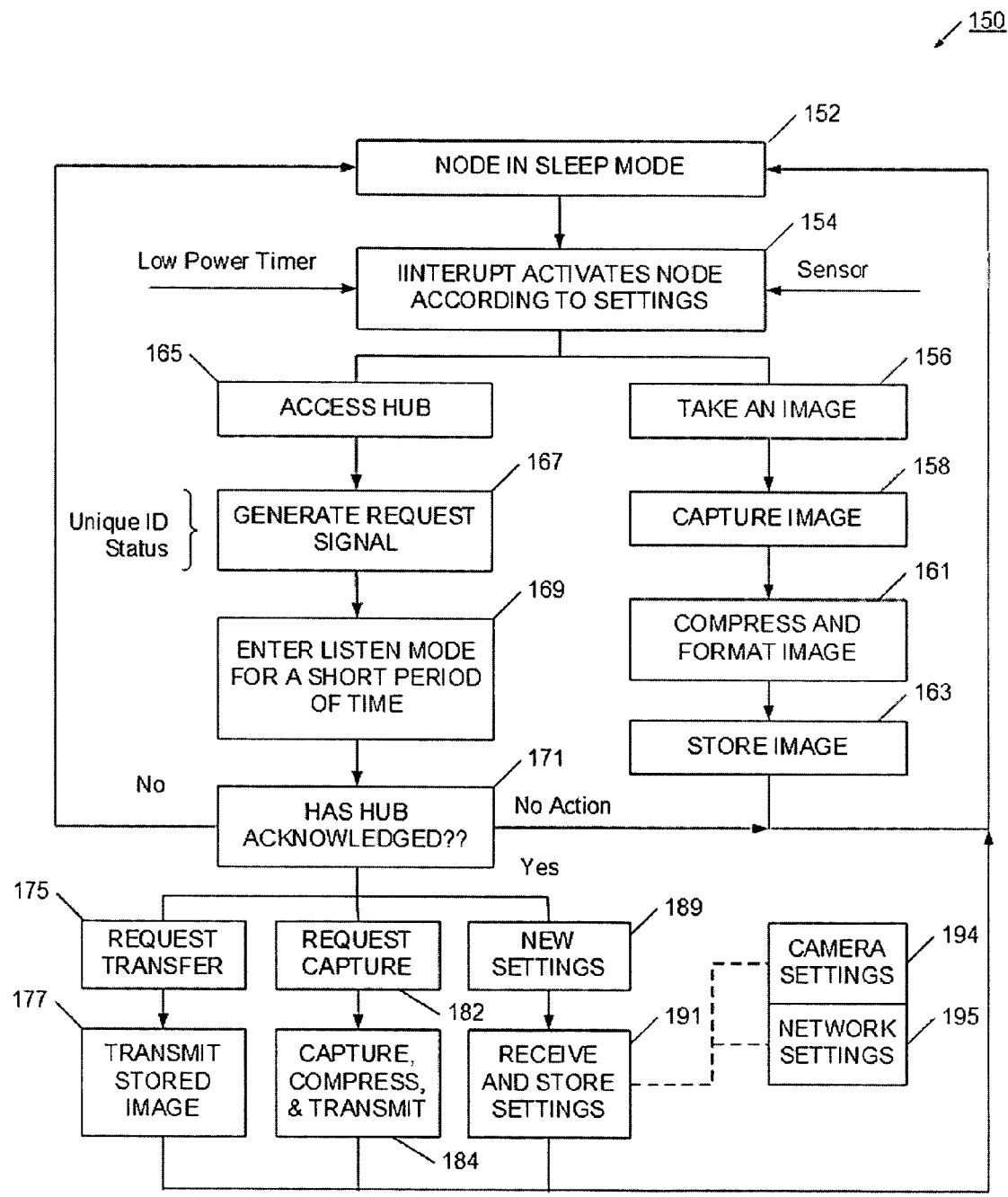
FIG. 5 is a flowchart for operating a node imager in a network sensor system in accordance with the present invention.

Referring now to FIG. 5, a more detailed description of a normal operating process is described. Normal process 150 has a node camera operating in a sleep mode as shown in block 152. In sleep mode, the camera node operates with minimal operational circuits, thereby conserving battery power. In a typical example, the radio will be deactivated in sleep mode, and the processor will be operating with only a low-power timer operating. In this configuration, it is typical for the node camera to use only 5 micro amps to 10 micro amps of power. The node camera remains in sleep mode until it receives an interrupt. Typically, the interrupt is received from a low-power timer operating on the processor. The low-power timer may be set to generate an interrupt at particular times, or after a particular time delay. In another example, a sensor is provided on the camera, which operates to detect an activity. For example, a microphone sensor may be provided to monitor for a noise exceeding a defined threshold. When the noise is detected, an interrupt is then generated. It will be appreciated that operating this sensor and monitoring for threshold violations will consume additional power. Once the interrupt is generated, the node camera wakes up and acts according to its defined settings. For example, the node camera may act differently depending on whether it was the low-power timer or the sensor which generated the interrupt. In another example, the node camera has multiple low-power timers, with each low-power timer causing a different reaction. For example, one low-power timer could cause the camera node to attempt to access the central node, while the other low-power timer merely causes the camera node to capture a next image.

In one example, the node camera may be configured to take an image 156 responsive to an interrupt. In this case, the radio would not need to be activated, as all activity will be local. The sensor then captures an image as shown in block 158, and the processor is used to compress and format that image as shown in block 161. The compressed and formatted image may then be stored in local memory are shown in block 163. An image ready flag or other indicator may be set to indicate that an image is ready for transmission.

In another example, the node camera attempts to access the control hub responsive to receiving the interrupt, as shown in block 165. In doing so, the camera hub generates a request or pilot signal as shown in block 167. The pilot or request signal may include a unique ID and status information. The unique ID may include the unique ID of the camera node, as well as the unique ID of the control hub. It will be appreciated that other information may be sent. The request message may also include a status for the camera hub. The status may include information such as, battery low, image ready for transfer, operating normally, or other status information. After the request signal has been sent, the camera node enters a listen mode for a short period of time as shown in block 169. Typically, the listen mode may extend for about 20 ms to about 50 ms. It will be appreciated that the length of the listen mode may be adjusted according to application needs. For example, in a configuration with only a few cameras, and when there is a need for extreme conservation of power, the listen mode may be set very short. However, in some cases more robust communication may be needed, or more cameras may be present. In this case, it may be desirable to have a longer listening mode. Further, method 150 is shown with generating only one request signal. It will be appreciated that additional request signals may be generated.

If the short period of time expires and the hub has not acknowledged as shown in block 171, then the camera node returns to sleep mode as shown in block 152. The camera node again remains in sleep mode until it receives an interrupt, most likely from the low-power timer. Since the low-power timer is inaccurate and relatively unstable, it will generate an interrupt at a time likely to avoid continual communication collisions. In another example, the low-power timer could have a randomization circuit to more directly generate random interrupts.

When the hub does acknowledge within the listen mode, the acknowledged message may contain a command for the camera node. In another example, the command may be received with multiple messages. The command may include for example, a command that no action is to be taken, and the camera node is returned to sleep mode as shown in block 152. In another example, the command may request that the camera hub transfer a stored image as shown in block 175. In response to this transfer request, the camera node transmits the storage image to the central node as shown in block 177. In another example of the command, the central hub may request that the camera node capture an image as shown in block 182. Responsive to the capture request, the camera node captures, compresses, and may transmit the image as shown in block 184. And finally, the hub may command the camera node to set new settings as shown in block 189. Responsive to the new settings command, the camera node receives and stores settings as shown in block 191. As described earlier, these settings may be either camera settings 194 or network settings 195.

Figure 6:
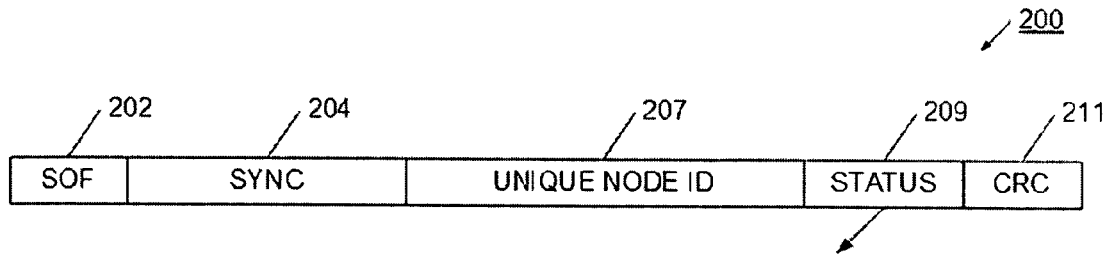
FIG. 6 is a block diagram of a request message for transmission in a network sensor system in accordance with the present invention.

Referring now to FIG. 6, an example request or pilot message is illustrated. Message 200 has a start of frame (SOF) bit or bits as shown in block 202. A set of synchronization bits may follow as shown in block 204. Unique node ID information 207 may also be included. The node identification information may include the unique identification for the node, as well as the unique identification for the hub. If no hub has yet to be assigned, then a null value may be included as the hub value. A set of status bits 209 may also be sent. The status bits may indicate for example, that the camera is operating normally, an image is ready for transfer, or the battery needs replacement. A CRC is also transmitted as shown in block 211. It will be appreciated that other types of validity checks may be used, and other information may be sent in the request or pilot signal. The forming and transmission of framed messages is well known, so will not be discussed in detail.

Figure 7:
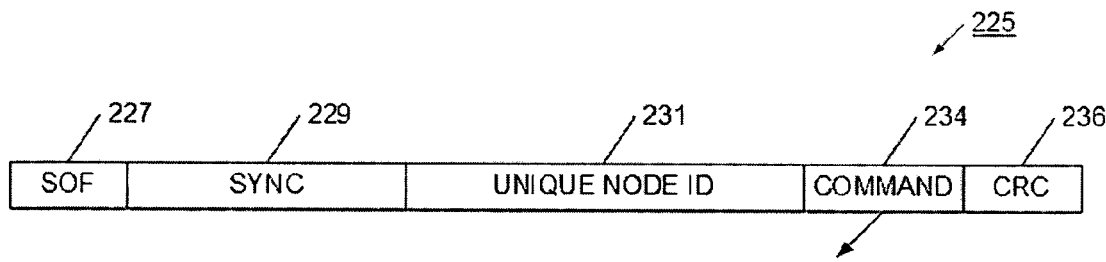
FIG. 7 is a block diagram of an acknowledgment message for transmission in a network sensor system in accordance with the present invention.

Referring now to FIG. 7, an example acknowledgment message is illustrated. Acknowledgment message 225 includes a start of frame (SOF) bit or bits 227, and a set of synchronization bits 229. Unique node identification information may be sent as shown in block 231, which may include the unique hub identification numbers, as well as the unique camera identification. Commands may also be communicated in the acknowledgment message as shown in block 234. Example commands could be to take no action, immediately capture and send an image, send additional status information, transmit stored images, or update camera or network settings. A CRC 236 may also be included. It will be appreciated that other verification processes may be used, and other information may be communicated in the acknowledgment message.

Figure 8:
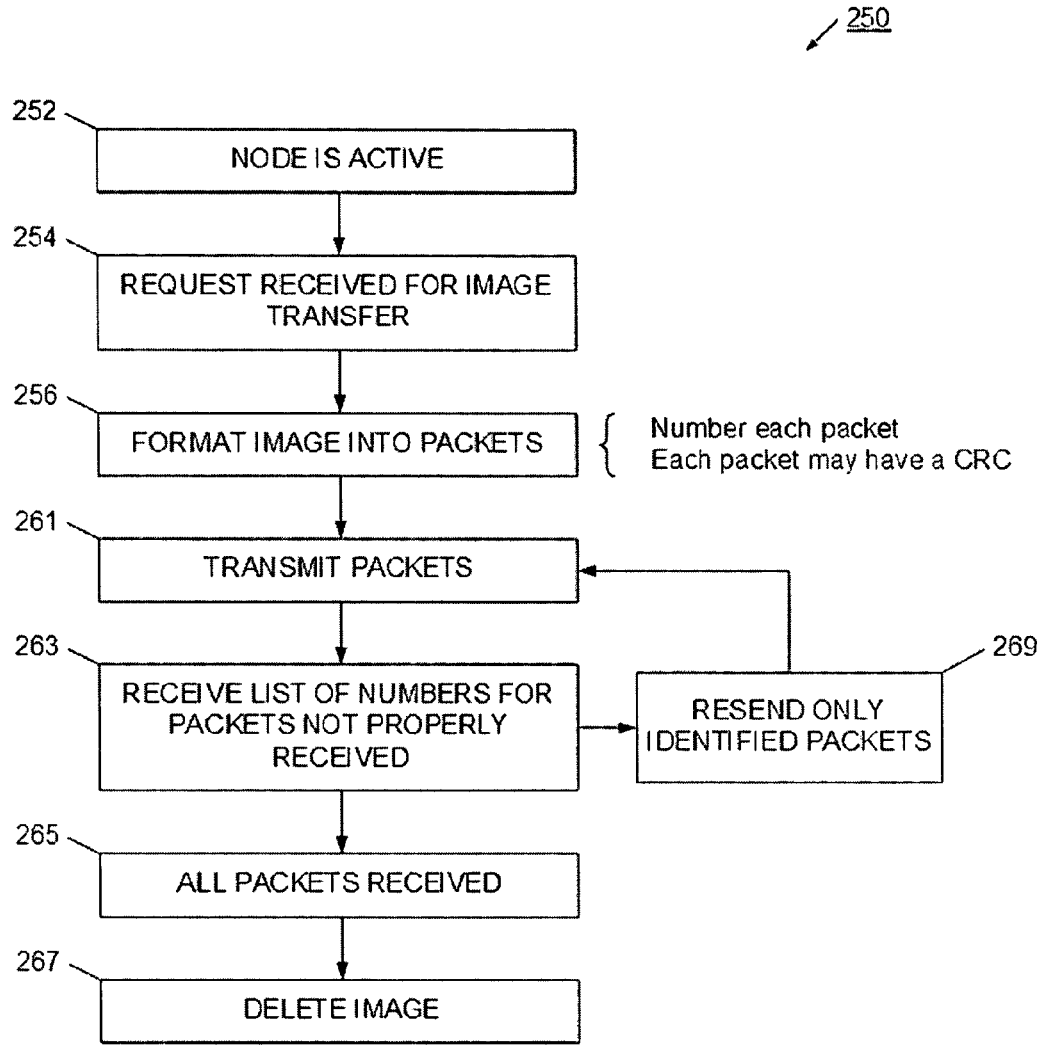
FIG. 8 is a flowchart for communicating an image file from a node imager in a network sensor system in accordance with the present invention.

Referring now to FIG. 8, a method for transmitting an image file is illustrated. Message 250 operates on a node camera as generally described with reference to FIG. 2. The node camera is communicating with a network hub as generally described with reference to FIG. 3. The camera node is active as shown in block 252. The central hub has requested that an image be transferred, and is ready to receive the image as shown in block 254. The node camera formats the image into packets, and numbers each packet. Additionally, each packet may have a CRC to assist in verifying transmission. It will be appreciated that other verification processes or systems may be used. The particular length of the packet may be adjusted according to application specific needs, however a 256 bit packet has been found to be particularly useful. With a typical sized CCD operating at a normal resolution and packet size sent to 256 bits, a typical image may be transferred in a few hundred packets.

Figure 9:
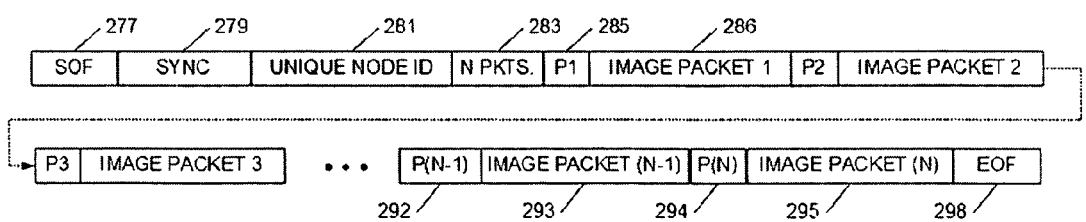
FIG. 9 is a block diagram of a super frame of image data for transmission in a network sensor system in accordance with the present invention.

Referring now to FIG. 9, an example image frame 275 is illustrated. Image frame 275 includes a start of frame indication 277 and synchronization bits 279. Unique node identification information 281 may be included to assure that the camera is sending its image information only to its associated hub. In this way, the unique node ID 281 may include the unique ID of the camera node, as well as a unique ID of the hub. The total number of packets to be communicated is also sent as shown in block 283. Then, each image packet is sequentially provided, along with its packet number. For example, the first package is identified by P1 285 and includes the 256 bits 286. The first packet is followed by the second packet and the third packet, until all packets are sent. For example, the second to last image is identified by its number 292 and its 256 bits 293 are sent, and the final packet 294 has its final 256 bits sent 295. With the whole image having been sent, the end of file indicator 298 is attached. Referring again to FIG. 8, this entire message is sent as one super frame as shown in block 261. This super frame is received at the hub, and a CRC is checked for each packet. Further, the control hub verifies that it has received all the packets. The receiver generates a list of packets not properly received, and sends the list of packet numbers back to the camera node as shown in block 263 The camera node puts together and transmits another super frame containing only the packet numbers and packets that were previously not properly received, as shown in block 269. This packet is then received and a similar process repeated until all packets have been properly received by the control hub as shown in block 265. Once the image has been verified to have been properly sent, the image may be deleted from the camera node as shown in block 267.

Figure 10:
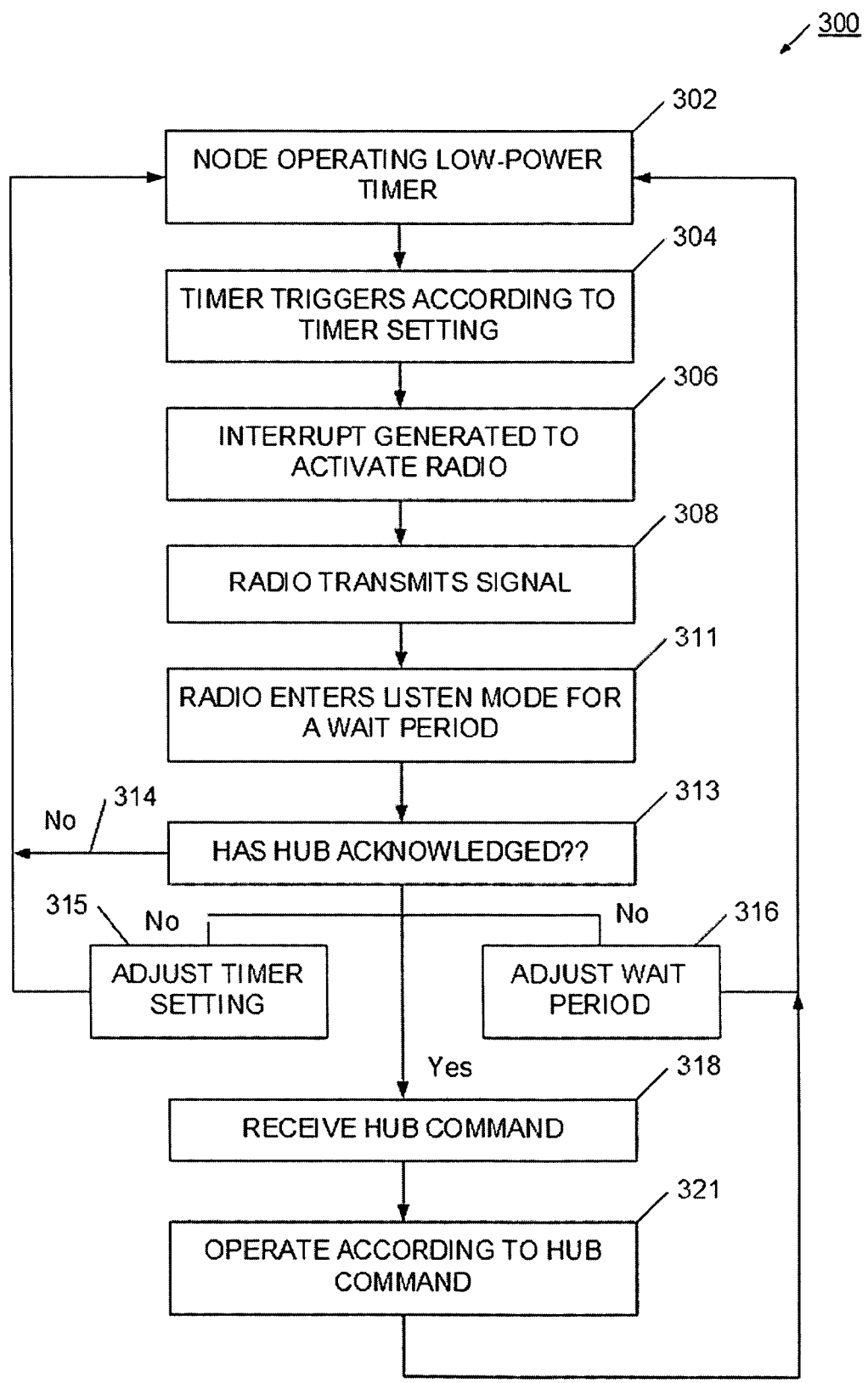
FIG. 10 is a flowchart for avoiding continued communication collisions in a network sensor system in accordance with the present invention.

Referring now to FIG. 10, method 300 is described which is useful for avoiding continual communication collisions. As generally described earlier, communication collisions may occur due to the asynchronous operation of the network sensor system. In particular, since the network sensor system does not operate with a common time base, the timing of requests and acknowledgments can not be robustly predetermined. Accordingly, method 300 provides a simple and convenient structure and process for assuring that each camera node may access a control hub. Method 300 has a camera node asleep operating with a low-power timer as shown in block 302. The low-power timer triggers according to the timer settings as shown in block 304. The timer thereby generates an interrupt which activates the radio as shown in block 306. The radio transmits a pilot or request single as shown in 308, and then enters a listen mode for a short period of time as shown in block 311. In some cases, the hub may not acknowledge the pilot signal within the wait period as shown in block 313. This may be due, for example, to a communication collision. A communication collision occurs when one camera is communicating with the central hub and another camera node attempts to establish communication. In this example, the second camera node would not receive an acknowledgment signal.

In the case where the hub has not acknowledged during the listen mode, the camera may simply reenter sleep mode as shown by line 314. Since the timer may be selected as a particularly inaccurate and unable stable timer, it will act to generate interrupts on a relatively random manner. In this way, even if camera nodes are set to the same delay time and other settings, the camera nodes will drift apart over time. Of course, it will be appreciated that using this natural process may take several or many iterations before communication is finally established. If this natural process does not provide sufficient robustness for the communication, additional processes to avoid collisions may be implemented. For example, if the hub has not acknowledged as shown in block 313, the timer may be adjusted as shown in block 315. By setting the timer according to some random delay value, it is likely that a communication collision may be avoided more quickly. In another example, if the hub has not acknowledged as shown in block 313, then the listen mode wait period may be adjusted as shown in block 316. This too may act to temporally separate camera nodes to the point where a communication collision is avoided. Once a communication collision has been avoided, then the hub is able to knowledge as shown in block 313. The camera node then receives hub information, which may include a command as shown in block 318. The camera node operates according to that command as shown in block 321, and when complete, reenters sleep mode as shown in block 302.

Figure 11:
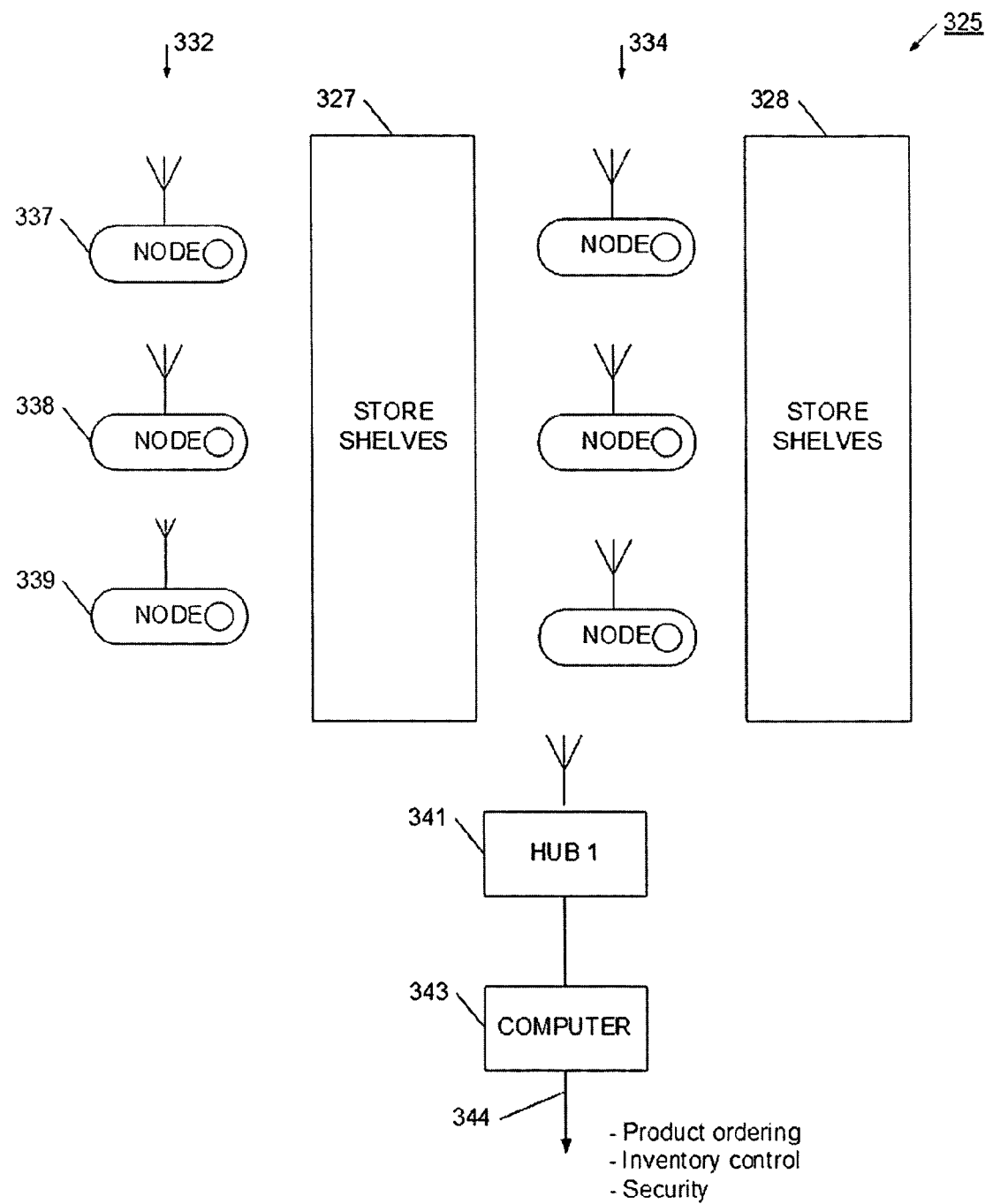
FIG. 11 is a block diagram of an inventory control system using a network sensor system in accordance with the present invention.

Referring now to FIG. 11, an example application using a network sensor system is illustrated. Application 325 is for inventory management of a retail or commercial establishment. It will be appreciated that this also could be inventory management in a warehouse or other merchandise stocking area. The inventory area has a set of shelves such as shelves 327 and 328. A set of cameras 332 is associated with store shelves 327, while a set of cameras 334 is associated with store shelves 328. Cameras 337, 338, and 339 are arranged to image merchandise stored on store shelves. From time to time, each of the cameras takes an image of the store shelves, and transmits those images back to hub 341. Hub 341 collects the images and communicates them to a central computer 343. Computer 343 may include network connections 344 for communication with other devices, such as supervisory control systems. Computer 343 analyzes the images and determines inventory changes. For example, a camera may take a first image of a shelf showing a fully stocked product. A later image may show that a product has been removed from the shelf. The computer 343 operates intelligent identification processes to determine which product has been removed, and how many of the product are missing. These products may then be deducted from inventory, and if appropriate, reports generated showing a reduction in stock inventory. Further intelligence may be added to the system for automatically ordering at certain stock levels, or triggering security warnings. For example, if the cameras are focused on a pharmaceutical shelf, and certain narcotic drugs are missing and do not show up on a point of sale device, then a security warning may be issued that narcotics have been illegally moved. It will be appreciated that application 325 may be applicable to a wide variety of industries, as well as useful in many specific applications. Application 325 shows a single hub communicating with six camera nodes, however it will be appreciated that many more camera nodes may be used, and additional hubs may be provided. For example, a single hub may have a useful range of about 100 feet in a warehouse inventory environment. Therefore, several hubs may be needed to monitor a large warehouse or a retail store.

Figure 12:
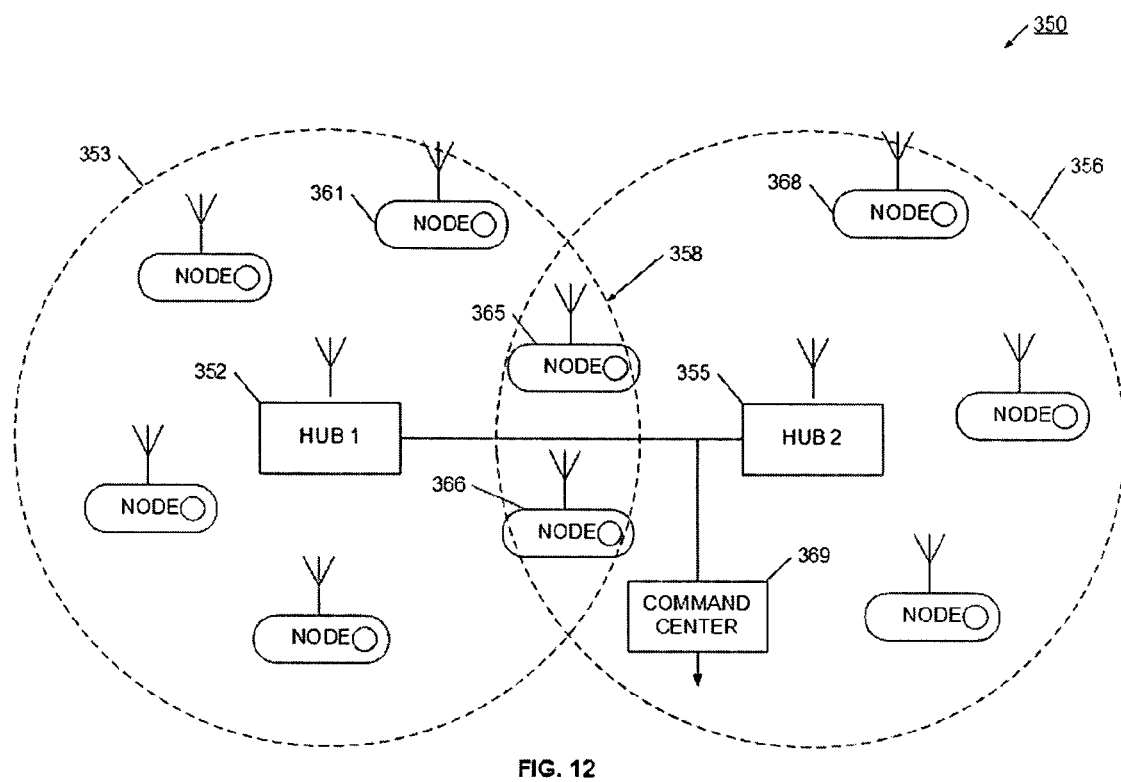
FIG. 12 is a block diagram of a network sensor system having multiple hubs in accordance with the present invention.

Referring now to FIG. 12, a multi-hub arrangement is illustrated. Network Sensor system 350 shows a first hub 352 having a set of cameras with in its range 353. These cameras include camera 361, 365, and 366. Network Sensor system 350 also includes hub2 355 which has a range 356. Several cameras are within range 356, including camera 365, 366, 368. A central command center 369 may also have a wireless or wired connection to the control hubs. As shown in FIG. 12, it is possible that some cameras, such as camera 365 and 366 are in overlapping zone 358. In this overlapping zone, each camera is in range of both hub1 352 and hub2 355. A simple solution to a possible conflict is to implement the initialization process as described with reference to FIG. 4. In this process, the camera is uniquely associated with the first hub that responds with an acknowledgment signal. For example, if node 366 asserts its pilot signal, and hub1 responds with an acknowledgment signal first, then node 366 will uniquely identify itself with hub1, and hub1 will include node 366 as one of its associated cameras. In a similar manner, if node 365 asserts its pilot signal and hub2 355 is the first to respond, then hub2 and node 365 will be statically and uniquely associated. It will be appreciated that more sophisticated association processes may be used. For example, a node, such as node 366 could wait to for receipt of all acknowledgement signals, and then evaluate acknowledgment signals for strength and quality. After determining which node has the strongest and best quality signal, the camera could then associate with the strongest hub. In another example, hubs could receive initial requests from a camera, and then through interconnection or essential command computer, determined which hub received the highest quality signal from the camera. The central control or hub arrangement could then instruct the proper hub to associate with the camera. These more sophisticated arrangements may enable a more robust communication process.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A network imager, comprising:
   a sensor constructed to provide image information;
   a radio constructed to be normally deactivated;
   a low power timer coupled to the radio and constructed to activate the radio from time to time;
   a memory coupled to the sensor and arranged to store the image information;
   a processor coupled to the sensor, radio, and memory; and
   a battery providing full operational power for the sensor, radio, memory and processor.

2. The network camera according to claim 1, wherein the low power timer is provided by the processor.

3. The network camera according to claim 1, wherein the processor normally operates in a sleep mode, and is activated responsive to the low power timer.

4. The network camera according to claim 1, further including:
   a pilot signal generator; and
   wherein the pilot signal generator operates responsive to the low power timer.

5. The network camera according to claim 1, further including:
   an acknowledgment circuit arranged to enter a listen mode responsive to the low power timer;
   the acknowledgment circuit coupled to the radio and constructed to deactivate the radio when no acknowledgement signal is received during the listen mode.

6. The network camera according to claim 5, wherein the acknowledgment circuit is constructed so that the listen mode is active for a short period of time.

7. The network camera according to claim 5, wherein the acknowledgment circuit is constructed so that the listen mode is only active for a time period of about 5ms to about 20ms.

8. The network camera according to claim 1, wherein the battery is arranged to provide less than about 10 microamps while the radio is deactivated.

9. The network camera according to claim 1, wherein the sensor is constructed as a CMOS imager.

10. The network camera according to claim 1, wherein the sensor is constructed as a CCD imager.

11. The network camera according to claim 1, wherein the low power timer provides imprecise time control to randomize the time when the low power timer activates the radio.

12. A wireless imager system, comprising
    a sensor constructed to provide image information;
    a radio constructed to be normally deactivated;

a low power timer coupled to the radio and constructed to activate the radio from time to time;

a memory coupled to the sensor and arranged to store the image information;

a processor coupled to the sensor, radio, and memory;

a battery providing full operational power for the sensor, radio, memory and processor; and the wireless imager operating the steps of:
  operating the wireless imager in a sleep mode;
  receiving an interrupt while the wireless imager is in sleep mode;
  activating the wireless imager responsive to the interrupt;
  transmitting a request signal;
  entering a listen mode for no longer than a listen period;
  waiting for an acknowledgement signal; and
  placing the wireless imager in sleep mode if no acknowledgment signal is received during the listen period.

13. The wireless imager system according to claim 12, wherein the interrupt is received from the sensor.

14. The wireless imager system according to claim 12, wherein the interrupt is received from the low power timer.

15. The wireless imager system according to claim 14, wherein the interrupt is received from the low power time at a rate less than about every 1 minute.

16. The wireless imager system according to claim 14, wherein the interrupt is received from the low power time at a rate less than about every 10 minutes.

17. The wireless imager system according to claim 12, wherein the listen period is about 5ms to about 20ms.

18. The wireless imager system according to claim 12, further including receiving the acknowledgement signal during the listen period.

19. The wireless imager system according to claim 18, further including the steps of:
  receiving an instruction from a hub controller; and
  capturing an image responsive to the instruction.

20. The wireless imager system according to claim 18, further including the steps of:
  receiving an instruction from a hub controller; and
  transmitting an image file responsive to the instruction.

21. The wireless imager system according to claim 18, further including the steps of:
  receiving an instruction from a hub controller; and
  placing the wireless imager in sleep mode responsive to the instruction.

22. The wireless imager system according to claim 18, further including the steps of:
  receiving new settings from a hub controller; and
  storing the new settings in the wireless imager.

23. The wireless imager system according to claim 12, wherein the activating step includes activating the radio.

24. The wireless imager system according to claim 12, wherein the activating step includes activating the processor.

25. The wireless imager system according to claim 12, wherein the interrupts are generated in a random pattern.

26. The network camera according to claim 1, wherein the low power timer provides time control to set the time when the low power timer activates the radio.

27. The network camera according to claim 1, wherein the low power timer provides time control to activate the radio at a particular predefined time.

28. The network camera according to claim 1, wherein the low power timer provides time control to activate the radio after a particular predefined delay.

29. The network camera according to claim 1, wherein the low power timer provides time control to activate the radio at a particular predefined time and delay that define a periodic activation.

* * * * *